United States Patent [19]

Pemmaraju

[11] Patent Number: 4,872,197
[45] Date of Patent: Oct. 3, 1989

[54] DYNAMICALLY CONFIGURABLE COMMUNICATIONS NETWORK

[75] Inventor: Ramarao V. Pemmaraju, Edison, N.J.

[73] Assignee: DTI Peripherals, Inc., New York, N.Y.

[21] Appl. No.: 914,392

[22] Filed: Oct. 2, 1986

[51] Int. Cl.$^4$ .................................... H04M 11/00
[52] U.S. Cl. .................... 379/93; 340/825.02; 340/825.05
[58] Field of Search .............. 379/93, 94, 96, 97, 379/98; 375/7, 8; 340/825.02, 825.05; 370/89

[56] References Cited

U.S. PATENT DOCUMENTS

| | | |
|---|---|---|
| 4,393,497 | 7/1983 | Cantwell Jr. ........................ 370/89 |
| 4,524,244 | 6/1985 | Faggin et al. ..................... 379/96 X |
| 4,646,320 | 2/1987 | Krishnan ............................... 375/8 |
| 4,686,698 | 11/1987 | Tompkins et al. . |
| 4,736,368 | 4/1988 | Szczepanek ........................ 370/89 |

FOREIGN PATENT DOCUMENTS 2016873 9/1979 United Kingdom ................ 379/94

OTHER PUBLICATIONS

Eric Hindin, "Digital Products Launches Peripheral-Sharing System", *Communications Week*, Jun. 2, 1986, pp. 48–49.

John McNamara, "Technical Aspects of Data Communication", ©1982, Digital Equipment Corp., Bedford, Mass., pp. 222–232, TK 5105.M4.

Britt Rorabugh, "Data Communications and Local Area Networking Handbook", ©1985, TAB Books, Inc., pp. 149–162; TK5105.R65.

*Primary Examiner*—Keith E. George
*Attorney, Agent, or Firm*—Pennie & Edmonds

[57] ABSTRACT

A dynamically configurable array of communication nodes capable of wide area networking utilizing existing communications lines is provided wherein any node possessing a transmitted data string comprising a message and identification information also possesses control of the network and generally is provided with a plurality of data paths to choose from. A setup mode initially sets up a data path among a network of nodes while a data mode subsequently permits data communication among the subnetwork of nodes.

20 Claims, 16 Drawing Sheets

DYNAMICALLY CONFIGURABLE COMMUNICATIONS NETWORK

BACKGROUND OF THE INVENTION

This invention relates generally to communications associated with data processing systems and more specifically to a dynamically configurable array of communication nodes utilizing existing communication lines.

Present day computing stations generally comprise a micro-computer/terminal, a printer to provide hard copies of data and a modem to communicate with data bases or other computers. Such computers are generally single task machines, capable of only running one applications program at a time or printing data or performing communications. Thus, it would be desirable for an external unit to operate in conjunction with the micro-computer to handle peripheral related processing such as printer control, resource sharing and on-line message handling via modem in order to free the micro-computer to handle application work.

An additional deficiency associated with present day devices is a failure to provide adequate wide area networking utilizing existing communication lines.

Presently, numerous schemes exist for exchanging data between computers and peripherals. Much attention has recently been directed to Local Area Networks (LANs) as a means for linking equipment within approximately a mile. However, these networks generally are static, i.e., once a network is installed, the topology of the network remains the same. Thus, the order of the nodes connecting computers is generally fixed and remains unchanged, providing a system with limited flexibility. Illustrative of such networks connecting computers and peripherals into LANs are Ethernet (TM), Decnet (TM) and PC net (TM).

Common network configurations, or topologies, include ring, bus and star configurations. Since each such configuration has specific advantages for specific applications, it would be desirable to provide a system capable of dynamically switching between different configurations thus providing the advantages of a plurality of individual configurations in a single system. Existing static networks, however, are incapable of dynamically switching between these types of configurations.

Present day wide area networks designed to connect computer and peripherals over large distances such as terrestrial microwave networks also do not fulfill these deficiencies. These networks require special cabling, microwave devices and interface circuitry, thereby increasing the cost per node.

SUMMARY OF THE INVENTION

The present invention comprises a method and apparatus to perform dynamic networking by setting up a subset network of nodes among an array of nodes and subsequently passing data among the particular subset of nodes to provide for dynamically controlled passage of data from a specific source to a specific destination. Each such node preferably comprises a peripheral coprocessor and generally has associated with it a micro- or mini-computer station. Networking among a subset of nodes is accomplished by the peripheral coprocessor preferably through the existing public switched network, i.e., telephone lines.

More specifically, to establish a network of nodes among the array of nodes, a first node establishes a data path connection to a second node using, for example, the communication lines and switching facilities of the public switched telephone network. The second node then establishes a data path connection to a third node and so forth, until an entire subset of desired nodes are interconnected. Once the desired nodes of the overall array are connected and a data path established, a data string from a sending device of a transmitting node will enter a receiving node though a line interface of the receiving node. This data string is then passed through a modem device to a serial adapter. A leading header portion containing source and destination information of the data string is then examined to determine whether the data string was intended for that particular node.

If the message portion of the data string was intended for that particular node, the leading header portion and a trailing header portion comprising an ending sequence are both stripped from the data string, leaving only the message intended for that particular node. This message is subsequently stored in memory and may be output by diverting the message from the serial adapter, passing the message through an I/0 controller and to a port of the node, thus making the message available to peripheral devices.

If the message portion of the data string was not intended for that particular node, the leading and trailing headers are not stripped. Rather, a data path connection is established to the destination node using, for example, the public switched telephone network; and the entire data string is routed through port select logic to a transmission device connected to one of the computer ports for transmission to the desired destination node.

Collisions between data strings are advantageously avoided since each port of a node is connected to, at most, a single node or peripheral device. For example, in the linear network of nodes A, B, and C, node A can transmit to node B simultaneously with node C transmitting to node B, since the data line-port combination connecting nodes A and B is separate from the data line-port combination connecting nodes B and C. In other words node A can only directly transmit to node B, not node C.

Accordingly, it is a principal object of the present invention to provide new and improved data processing systems.

Another object of the invention is to provide a new and improved port selection system.

Another object of the invention is to provide a more efficient networking system for a plurality of computer stations.

A further object of the invention is to provide a new and improved networking system to increase throughput.

A still further object of the invention is to provide wide area networking utilizing existing communication lines.

A further object of the invention is to provide a dynamically configurable network of computer stations.

BRIEF DESCRIPTION OF THE DRAWINGS

These and other objects, features and advantages of the invention will become more readily apparent with reference to the following description of the invention in FIG. 1 depicts, in block diagram form, a networking system configuration, of the present invention.

DETAILED DESCRIPTION OF THE INVENTION

Figure 1:
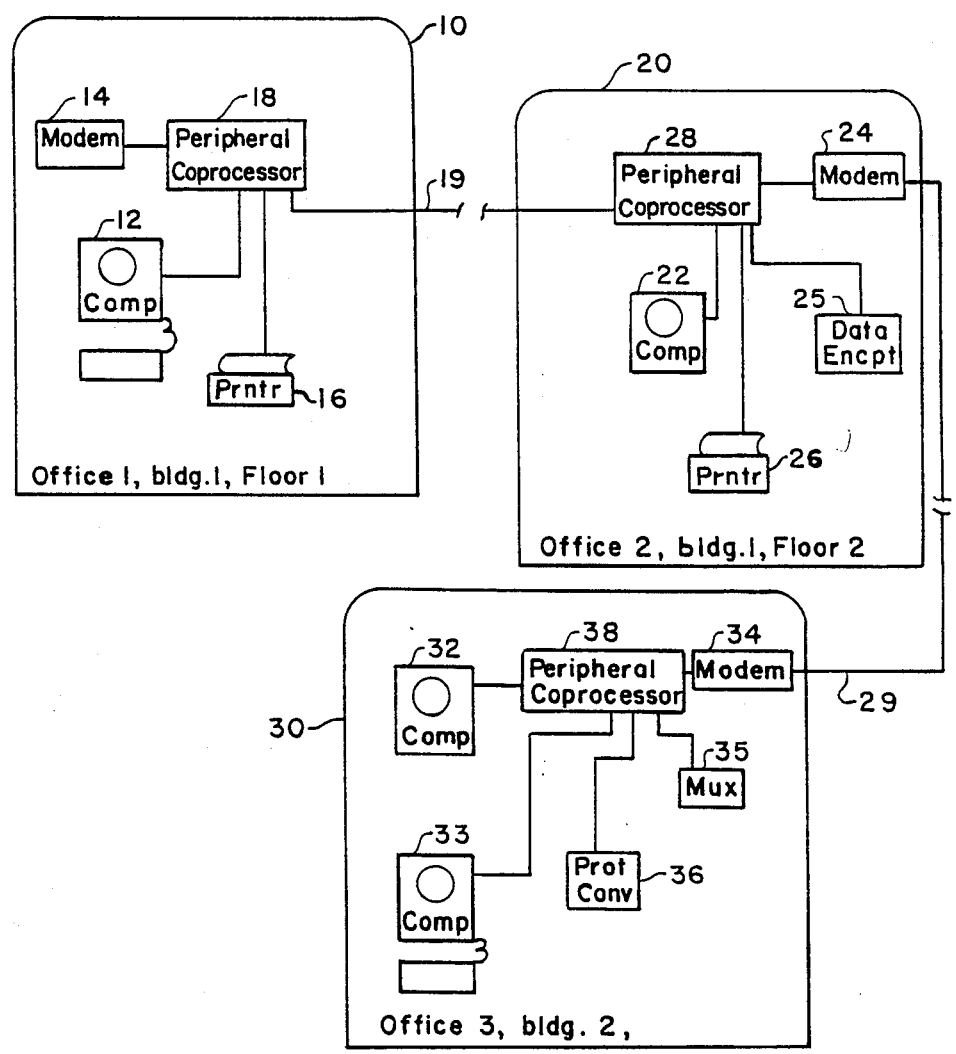

Referring now to FIG. 1, a networking configuration of the present invention comprises a first computer station 10, a second computer station 20 and a third computer station 30.

First computer station 10 comprises a first computer 12, a modem 14, and a printer 16 all connected to a peripheral coprocessor 18. Illustratively, first computer 12 is an International Business Machines personal computer (IBM PC).

Second computer station 20 comprises a second computer 22, a modem 24, a data encryptor 25, and a laser printer 26, likewise all connected to a peripheral coprocessor 28. Illustratively, second computer 22 is an Apple IIC and data encryptor 25 is of the in U.S. Pat. No. 4,596,898 to the present applicant, Pemmaraju.

Communication line 19 connecting peripheral coprocessor 18 of first computer station 10 with peripheral coprocessor 28 of second computer station 20 preferably is an existing telephone line. However, if the distance between peripheral coprocessors 18, 28 is less than approximately fifty feet, a line conforming to IEEE standard RS232 may be used.

Third computer station 30 comprises a third computer 32, a fourth computer 33, a modem 34, a multiplexer 35 and a protocol converter 36, all connected to a peripheral coprocessor 38. Illustratively, third computer 32 is a Digital Equipment Corporation personal computer and fourth computer 33 is an IBM PC. Multiplexer 35 aids in the transmission and reception of multiplexed data over communication line 29. Protocol converter 36 converts the protocol used by one computer system to the protocol used by another computer system. Protocol is a control scheme which deals with addressing individual computer stations in a multi computer station environment as well as scheduling the use of the communication line. Computer 32 may switch between any number of devices connected to peripheral coprocessor 38 such as computer 33 and station 20.

Communication line 29 connecting peripheral coprocessor 28 of second computer station 20 with peripheral coprocessor 38 of third computer station 30 preferably is an existing telephone line where the distance between computer stations 20, 30 is greater than the IEEE recommended communication distance of approximately fifty feet for communication over RS232 communication lines.

In the practice of the invention, a large number of such computer stations may be dynamically interconnected into networks of arbitrary topology.

Figure 2A:
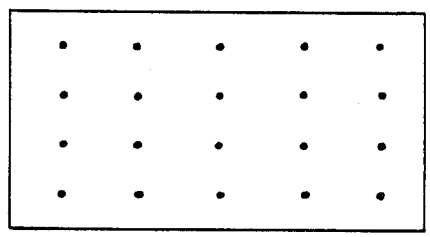
FIGS. 2A-D depict a plurality of different network configurations available for the present invention.

FIGS. 2A-D depict various possible network topologies available through the present invention. FIG. 2A depicts a twenty node subset of the universal set of possible nodes, a computer station being located at each node. The universal set of nodes is preferably as large as practical; and each node or computer station is uniquely identified, for example, by a telephone number. In accordance with the invention, different sets of topologies of differing interconnection patterns and differing number of nodes, such as those depicted in FIGS. 2B-D, may be dynamically configured and reconfigured from this universal set.

Figure 2B:
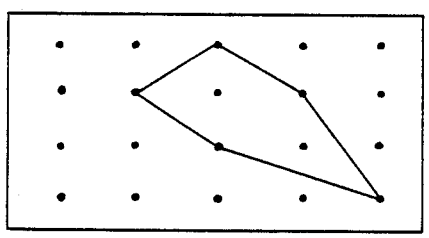

FIG. 2B illustrates a configuration wherein nodes are connected to each other to form an enclosed structure. Transmission around the ring may take place in a single direction, i.e., clockwise or counterclockwise or, alternatively, simultaneously in both clockwise and counterclockwise directions as may be the case in a full duplex telephone line ring network.

Figure 2C:
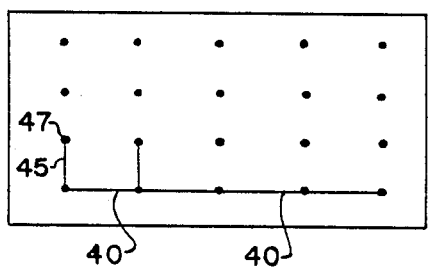

FIG. 2C illustrates a bus, or multipoint configuration wherein a single common communication line 40 is provided to connect a plurality of nodes.

Figure 2D:
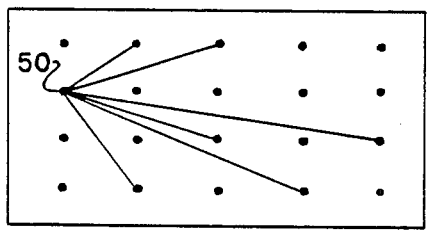

FIG. 2D illustrates a star configuration wherein a central controller 50 provided with multiple ports arbitrates all data transfer requests. A separate communication line is provided for each member node to connect it to central controller 50. If the number of stations is large, the plurality of communication lines from the individual nodes are preferably connected to the central controller via a multiplexer. The multiplexer collects data from the individual lines and presents them to the computer, together with identifying addresses.

In accordance with the invention, the networks illustrated in FIGS. 2B-D are dynamically configurable. For example, a four node network may be set up in the following order: A-B-C-D; alternatively the same four node network may be set up with a different topology, A-B-D-C, or A-C-B-D.

A particular configuration must initially be set up prior to passage of data. Setup of a particular network is generally accomplished as follows. A first station contacts a second station, passing to the second station identifying information such as phone numbers of all stations it wishes to add to the network. The second station then contacts the first of these stations, passing the remainder of the first station's list of desired stations, as well as appending its own list of desired stations, and so forth. Contact between stations is preferably accomplished by telephony communications between peripheral coprocessors of respective stations.

Referring back to the illustrative network of FIG. 1, once a network is set up in accordance with the above procedure, station 10 can pass data directly to station 20 and similarly, station 20 can pass data directly to station 30. For passage of data from station 10 to station 30, station 10 must transmit to station 20 a data string comprising a leading header, message and trailing header. Station 20 will then examine the leading header portion of the data string to determine the intended destination of the message and subsequently pass the data string over communication line 29 to station 30.

In the case of a second node receiving a message from a first node to be transmitted to a third node, the second node may append its own source and destination headers as well as its own data onto the message stream for transmission to the third node. In such a case, data from two different nodes and part of the same message stream is distinguished by separating the two data-address combinations by a delimiter, i.e., a unique bit pattern.

Whichever node possesses the data string at a specified moment also possesses control of the network. This master node may pass the entire data string to additional nodes or may initiate data transmission to the rest of the network.

Figure 3:
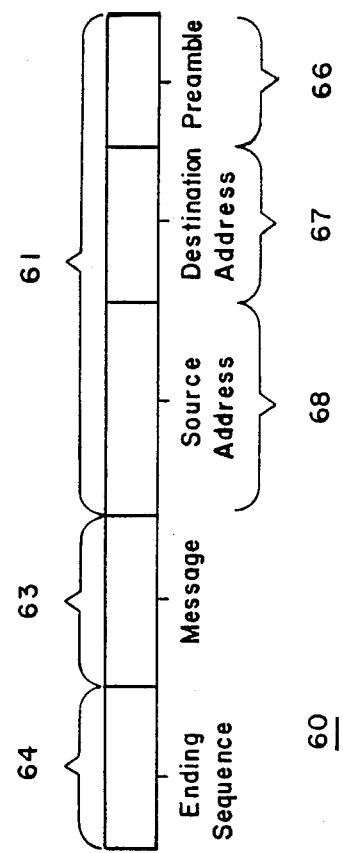
FIG. 3 depicts the format of a data string transmitted from a source node to a destination node.

FIG. 3 depicts the format of a data string transmitted from a source to a destination. Data string 60 comprises leading header 61, message 63 and trailing header 64. Leading header 61 further comprises preamble 66, destination address 67 and source address 68.

Information contained in leading header 61 permits a computer station to determine whether to pass the data string to the intended computer station or strip the leading header 61 and trailing header 64 and store the remaining message 63 in memory. More specifically, preamble 66 is a pre-determined string of bits or bytes which identifies that a station on the network is transmitting data. When a receiving station recognizes such a string of bits or bytes in the preamble, it examines destination address 67 of leading header 61 to determine the identity of the intended destination.

Figure 4:
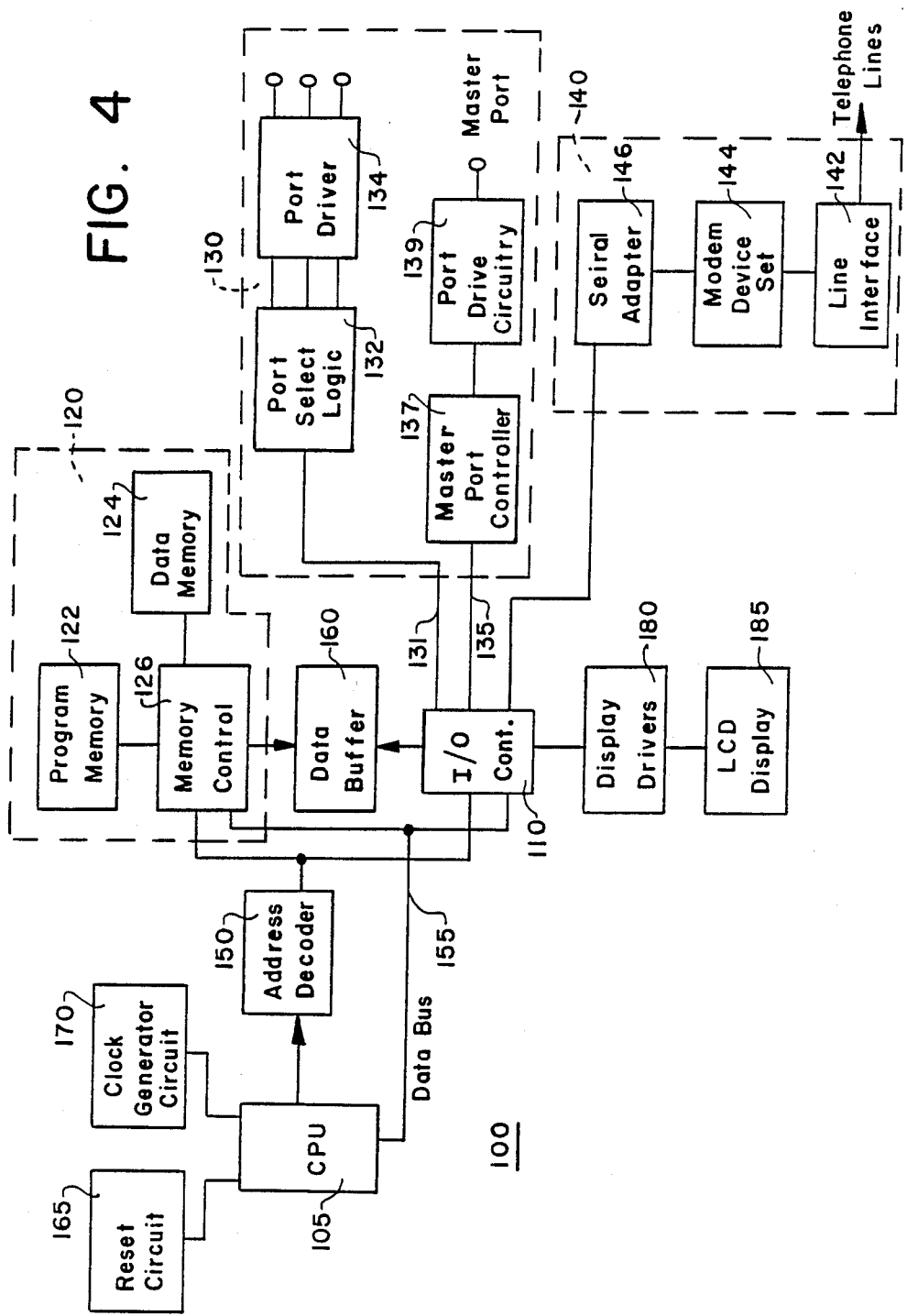
FIG. 4 is a block diagram of a peripheral coprocessor apparatus of the present invention.

Referring to FIG. 4, a preferred embodiment of a peripheral coprocessor 100 comprises central processing unit (CPU) 105, I/O controller 110, memory 120, port circuitry 130 and telephone interface circuitry 140. Memory 120 comprises program memory 122, data memory 124 and memory control 126. Address decoder 150 supplies memory control 126 and I/O controller 110 with the proper address to store/retrieve instructions placed in program memory 122 and data placed in data memory 124. Similarly, I/O controller 110 provides memory control 126 with control signals for memory accessing. Data bus 155 connects CPU 105, I/O controller 110 and memory control 126. Data buffer 160 provides temporary storage of data when it is impractical to transmit the data.

Central processing unit 105 is provided with reset signals from reset circuit 165 as well as clock signals from clock generator circuit 170.

Port circuitry 130 is controlled by I/O controller 110. Data can generally be output by the I/O controller either over line 131 or line 135. Data output over line 131 is input to port select logic 132 which determines which specific port of a plurality of illustratively serial ports is to receive the serial data. Port driver 134 amplifies the data and passes the data onto the specified port. Various peripheral devices such as modems, printers, multiplexers, data encryptors, additional computers or the like may be connected to these ports. Data output on line 135 is input to master port controller 137 which outputs the data to port drive circuitry 139 which applies the data to the master port of the peripheral coprocessor.

Telephone interface circuitry 140 comprises line interface 142, modem device set 144 and serial adapter 146. When a connection is provided to telephone lines via line interface 142, available data is preferably passed through line interface 142 and input to modem device set 144. Modem device set 144 modulates/demodulates signals to provide proper coupling between the telephone line and the circuitry of peripheral coprocessor 100 as well as peripheral devices connected to the output ports of the coprocessor. The output from modem device set 144 is input to serial adapter 146 which transforms the serial data transmitted over the telephone line into parallel data which is preferably used by CPU 105, I/O controller 110, memory 120 and associated circuitry. The output of serial adapter 146 is input to I/O controller 110.

Peripheral coprocessor 100 further comprises display driver 180 and LCD display 185 to generally display the status of the device. I/O controller 110 inputs such status signals to display driver 180 which drives LCD display 185.

In the practice of the invention, a data string transmitted from another node to peripheral coprocessor 100 by way of a telephone line is input to line interface 142 and demodulated by modem device 144. Serial adapter 146 then performs a serial to parallel conversion, with the resultant parallel data being input to I/O controller 110. I/O controller 110 then directs the data string to data memory 124 via memory control 126. The leading header is subsequently examined by CPU 105 to determine whether the transmission was intended for that node. If the message was intended for that node, the message will be stored in memory after stripping the leading and trailing headers. If the message needs to be output to a peripheral device such as a printer, the message is routed through I/O controller 110 over line 131, through port select logic 132, through port driver 134 and onto the port to which the desired device is connected. If the message needs to be output to a computer or terminal on the master port, I/O device 110 diverts the message onto line 135, through master port controller 137, through port drive circuitry 139 and onto the master port.

However, if the data string input to line interface 142 is not intended for that node, I/O controller 110 will route the entire data string over line 131 to port select logic 132 to a transmission device such as a modem connected to one of the ports from which it is ultimately transmitted to the destination node.

Figure 5:
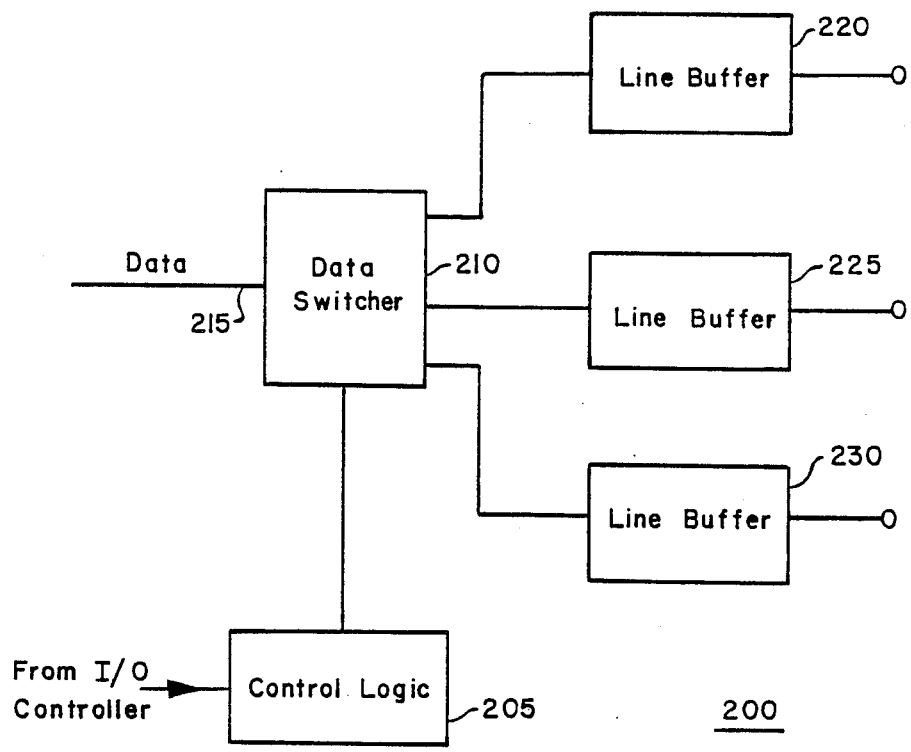
FIG. 5 is a block diagram of the port selection logic 132 of FIG. 4.

FIG. 5 depicts the port select logic 132 of FIG. 4 in greater detail. The port select logic comprises control logic 205, data switcher 210 and line buffers 220, 225, 230. The I/0 controller of the peripheral coprocessor outputs command signals to control logic 205 which then outputs control signals to data switcher 210. Based upon these control signals, data switcher 210 will then pass data on its input line 215 to one or more of line buffers 220, 225, 230. The line buffers then apply this data to the desired port(s).

Figure 6:
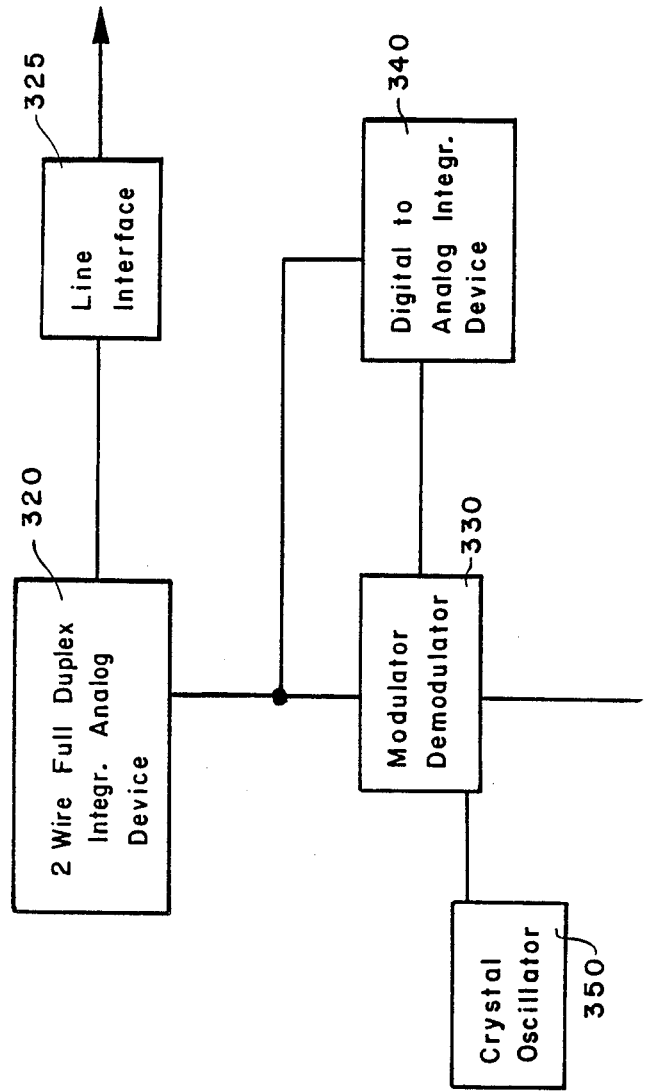
FIG. 6 depicts, in block diagram form, a system configuration of the modem device set 144 of FIG. 4.

FIG. 6 depicts the modem device set 144 of FIG. 4 in greater detail. The modem device set comprises a line interface 325, a two wire full duplex analog device 320, a modulator/demodulator 330, a digital to analog converter 340 which converts the digital signal into an analog signal and a crystal oscillator 350. Device 320 comprises a line filter and a hybrid which transforms signals used by modulator 330 to signals adaptable for use by a two wire system. Modulator/demodulator 330 modulates or demodulates the data onto a carrier. Either frequency shift keying (FSK) or differential phase shift keying (DPSK) are the modulation techniques preferably employed, depending upon the baud rate of the transmission.

Figure 7:
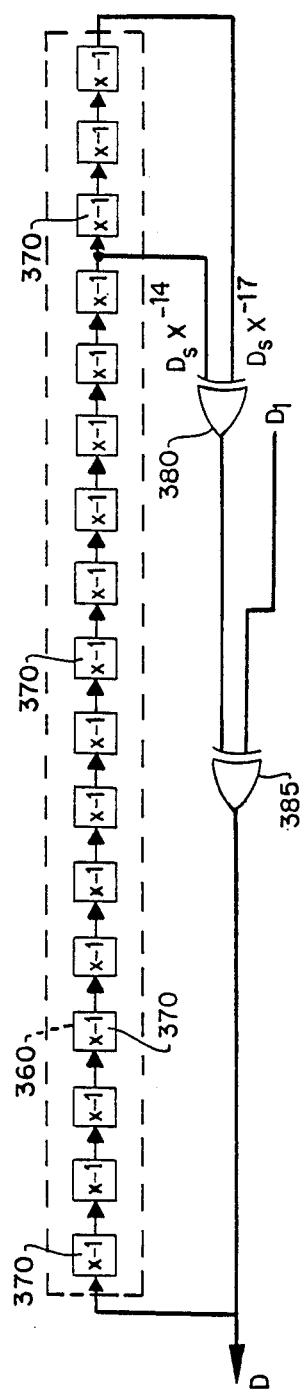
FIG. 7 depicts, in schematic form, the data scrambler which equalizes transmission energy throughout the transmission spectrum.

FIG. 7 illustrates a data scrambler which ensures that transmitter energy is spread evenly throughout the transmission spectrum, comprising a tapped delay line 360 and exclusive OR gates 380, 385. Delay line 360 comprises one or more taps 365 and a plurality of delay elements 370 connected in series, each of which delays the data signal by a unit of time equal to the time between successive signals. The scrambler preferably used in conjunction with the modem device set of FIG. 5 is conventional and its operation will be familiar to those skilled in the art.

Figure 8:
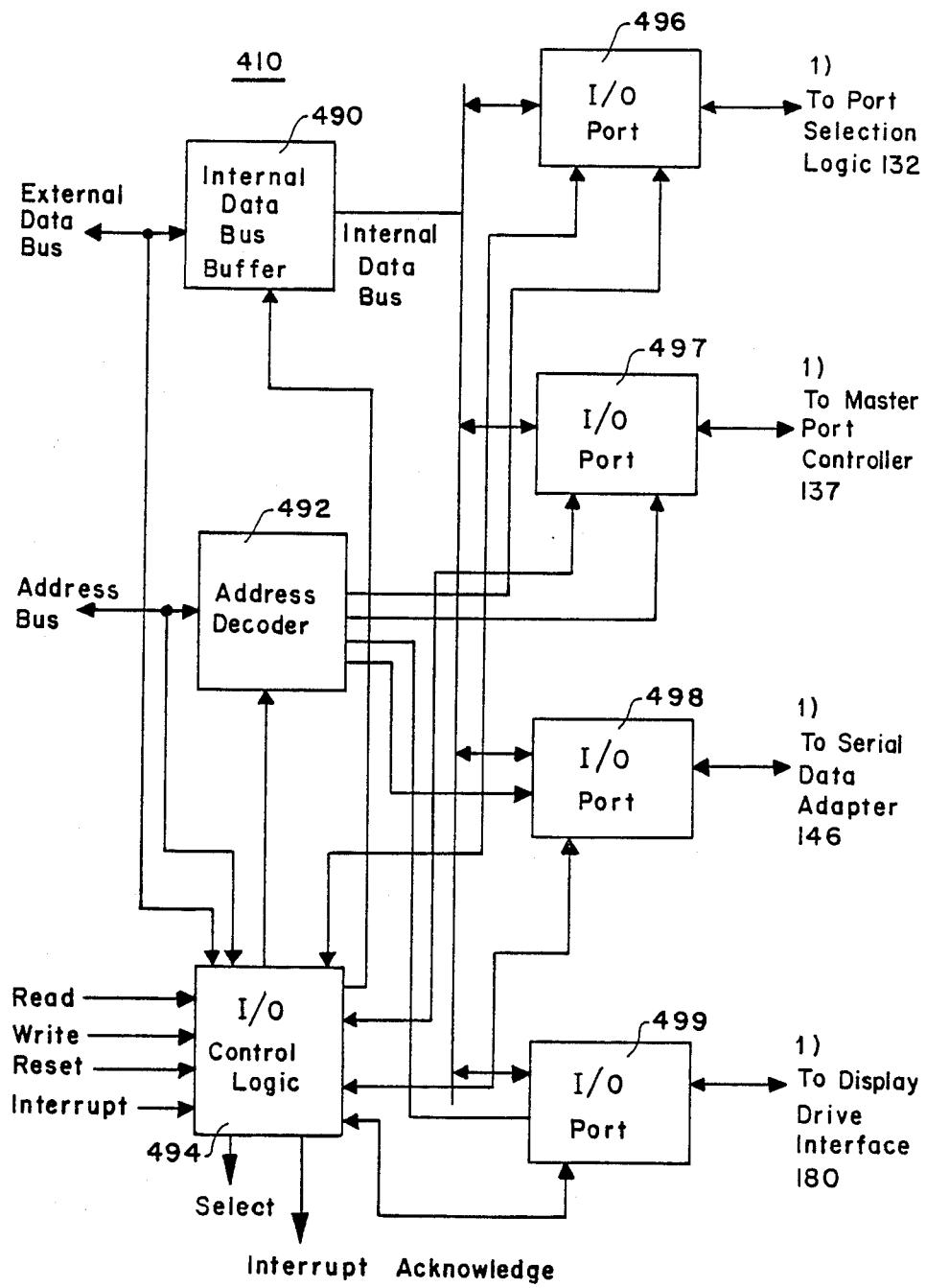
FIG. 8, depicts, in detailed block diagram form, the I/0 controller of FIG. 4.

FIG. 8 depicts I/0 controller 110 of FIG. 4 in greater detail. I/0 controller 110 comprises internal data bus buffer 490, I/0 control logic 494 and I/0 ports 496–499. Address decoder 492 of FIG. 8 corresponds to address decoder 150 of FIG. 4.

Internal data bus buffer 490 buffers the data between the internal data bus of the I/0 controller and the external data bus connected to I/0 control logic 494 and the CPU. The external data bus of FIG. 8 corresponds to data bus 155 of FIG. 4.

I/0 control logic 494 receives input signals Read, Write, Reset, Interrupt and Select from the CPU and associated logic. Additional signals such as Acknowledge, Status Read, Port Selection and Parameter Initialization are provided by the CPU via the data bus. Control logic 494 also provides interrupt and DMA (Direct Memory Access) control signals to the CPU.

I/0 ports 496–499 are provided for communication over a number of serial ports (via port 496), a master port (via port 497), a modem (via port 498) and an LCD display (via port 499).

Address decoder 492 serves to latch the address on the address bus. This address is decoded and subsequently used to select the appropriate I/0 ports.

In accordance with the invention, the I/0 controller mediates and services requests from the port select logic, the master port controller, the serial adapter that drives the modem and the display drivers. The I/0 controller generates the logic signals at the appropriate voltage levels and provides the current source and sink capability. It also provides Direct Memory Access (DMA) capability so that devices can transfer data to the memory directly without involving the CPU. The I/0 controller is further responsible for arbitrating requests among the various devices connected to it, handling the device interrupts and implementing a hierarchical scheme for device access.

Figure 9:
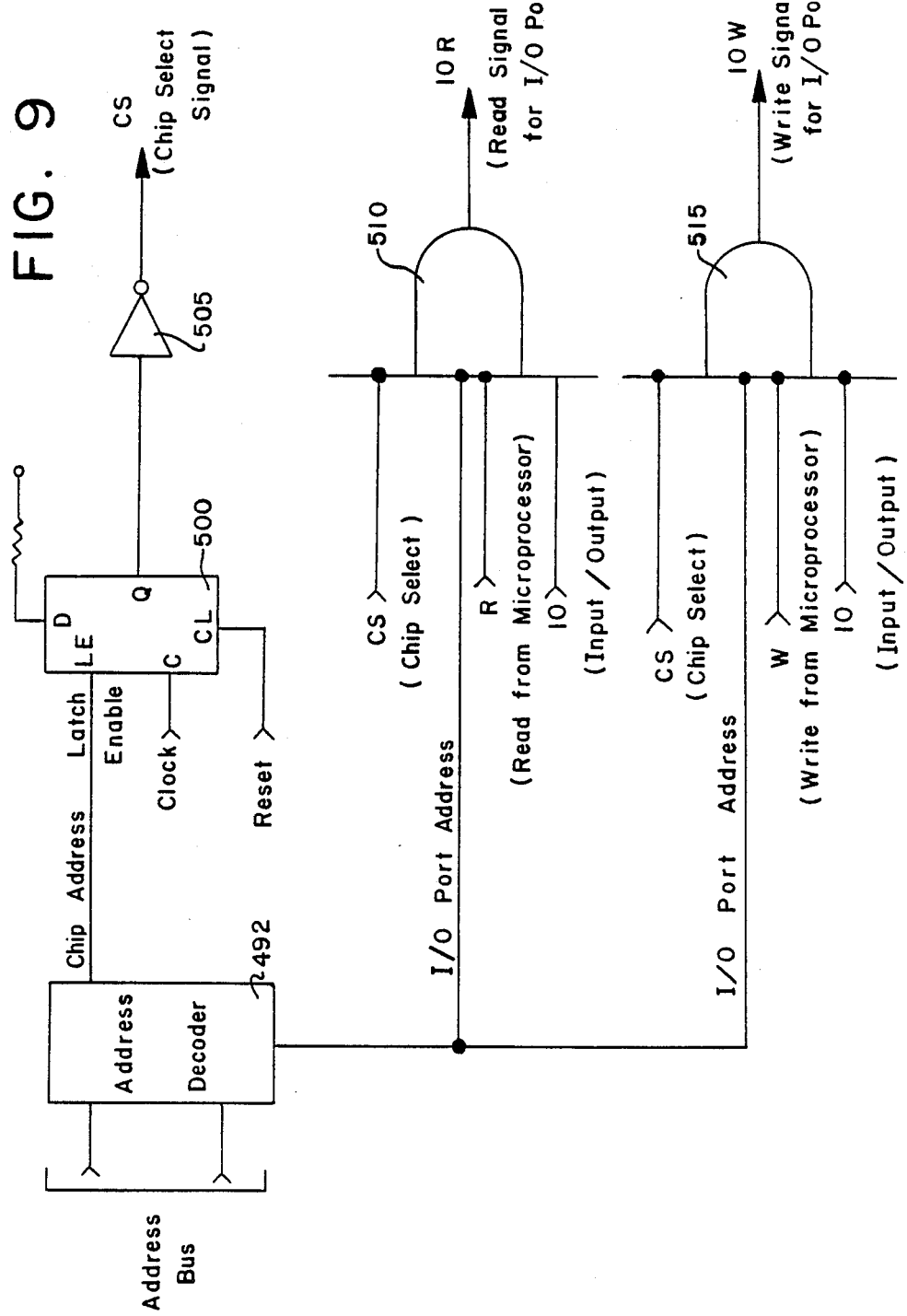
FIG. 9 depicts in detail a portion of the I/0 control logic circuitry 494 of FIG. 8 which generates a chip select signal, an I/0 read signal and an I/0 write signal.

FIG. 9 depicts in detail a portion of the control logic circuitry of FIG. 8 which generates a chip select signal, an I/0 read signal and an I/0 write signal. Chip select signal CS enables the operation of the I/0 controller and prevents more than one signal line from being connected to the microprocessor bus at any given time.

I/0 read signal IOR is provided to the I/0 ports of FIG. 8 during a read mode wherein AND gate 510 outputs the I/0 read signal IOR by ANDing together the chip select signal, the decoded address output from address decoder 492, the read signal from the CPU and an input/output control signal. The data residing in the I/0 port is latched onto the microprocessor bus during this read mode.

I/0 write signal IOW is provided to the I/0 ports of FIG. 8 during a write mode wherein AND gate 515 outputs the I/0 write signal IOW by ANDing together the chip select signal, the decoded address output from address decoder 492, the write signal from the CPU and an input/output control signal. The data residing on the external data bus is latched into the I/0 port during this write mode.

In addition to providing a chip select signal, read control and write control as illustrated in FIG. 9, I/0 control logic 494 of FIG. 8 provides status and control registers. The status register provides data to the microprocessor regarding the status of the I/0 controller. Illustrative of such data is identification of currently active I/0 ports, whether an I/0 port is in read mode or write mode, whether an I/0 port has generated an interrupt or finished its task, and whether an I/0 port wishes to perform a direct memory transfer.

The control register provides data to the microprocessor regarding commands issued by the microprocessor. Illustrative of such data is acknowledgment of an interrupt, request for I/0 port status, clearing I/0 port buffers and granting direct memory access.

Referring to FIGS. 10–13, circuitry is described which provides for operation of the present invention in three different modes, namely setup mode in which the network is set up, data mode in which the data is transferred and terminate mode in which a network element removes itself from the network.

A five element linear network comprising elements A, B, C, D and E in sequential order is preferably set up as follows. Station A contacts station B, giving station B a list of all the stations it desires on the network, illustratively stations C and D. Station B then contacts station C, passing station A's remaining list, namely station D, and adds its own list, namely station E. Station C then contacts station D and passes the remaining list, namely station E. Lastly, station D contacts station E to complete the network. Illustratively, these contacts are made through the public switched telephone network; but they could be made through other switched networks as well. Additionally, once a specific network is set up and data transmission initiated, any node may remove itself from the network or add additional nodes.

The list(s) passed from a station to another station in accordance with the setup mode illustratively comprises an eight-bit byte and identification numbers of stations remaining to be added to the network. These identification numbers are illustratively ten digit telephone but may comprise any preferably unique series of characters. The two least significant bits of the eight-bit byte identify the present operating mode and are 01 for the setup mode. The six most significant bits provide the number of stations remaining to be added to the network.

Figure 10:
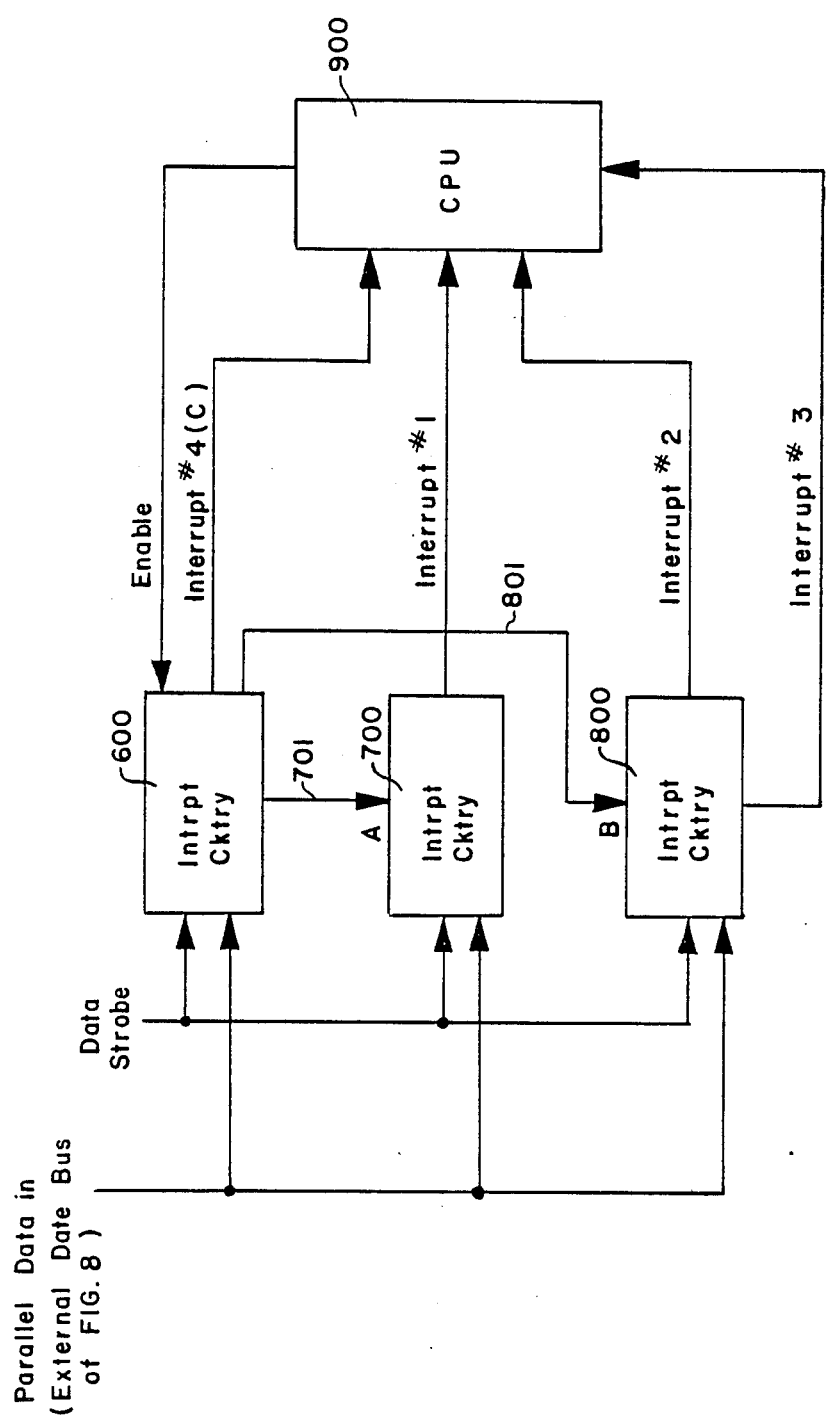
FIG. 10 depicts, in block diagram form, interrupt circuitry of I/0 control logic 494 of FIG. 8.

FIG. 10 depicts an overview of interrupt circuitry comprising circuits 600, 700, 800 and CPU 900. CPU 900 corresponds to CPU 105 of FIG. 5. Circuit 600 detects the particular mode of operation which is presently required, namely setup mode, data mode or terminate mode. Circuit 700 is activated by circuit 600 upon a finding that the invention shall operate in the setup mode. Circuit 800 is activated by circuit 600 upon a finding that the invention shall operate in the data mode. The data strobe signal input to circuits 600, 700 and 800 is output by the I/0 ports of the node and indicates that data is provided on the line.

Figure 11:
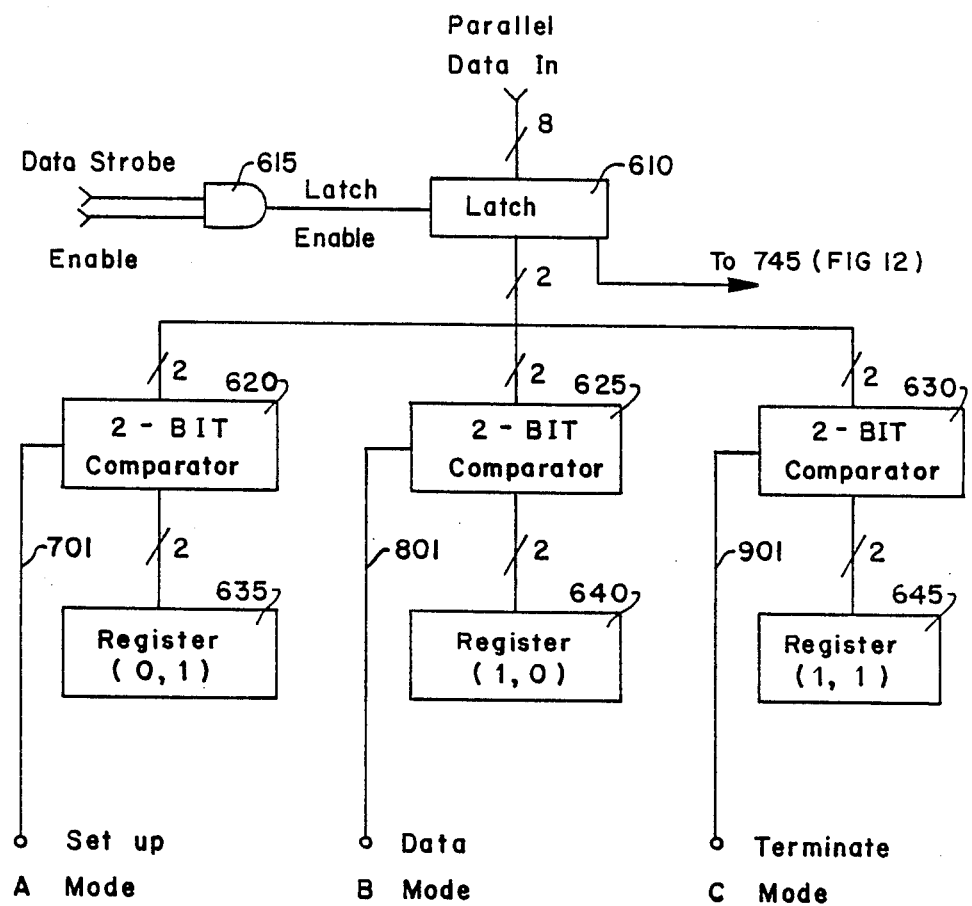
FIG. 11 depicts, in detailed schematic form, element 600 of FIG. 10 which detects the mode of operation required.
Figure 12:
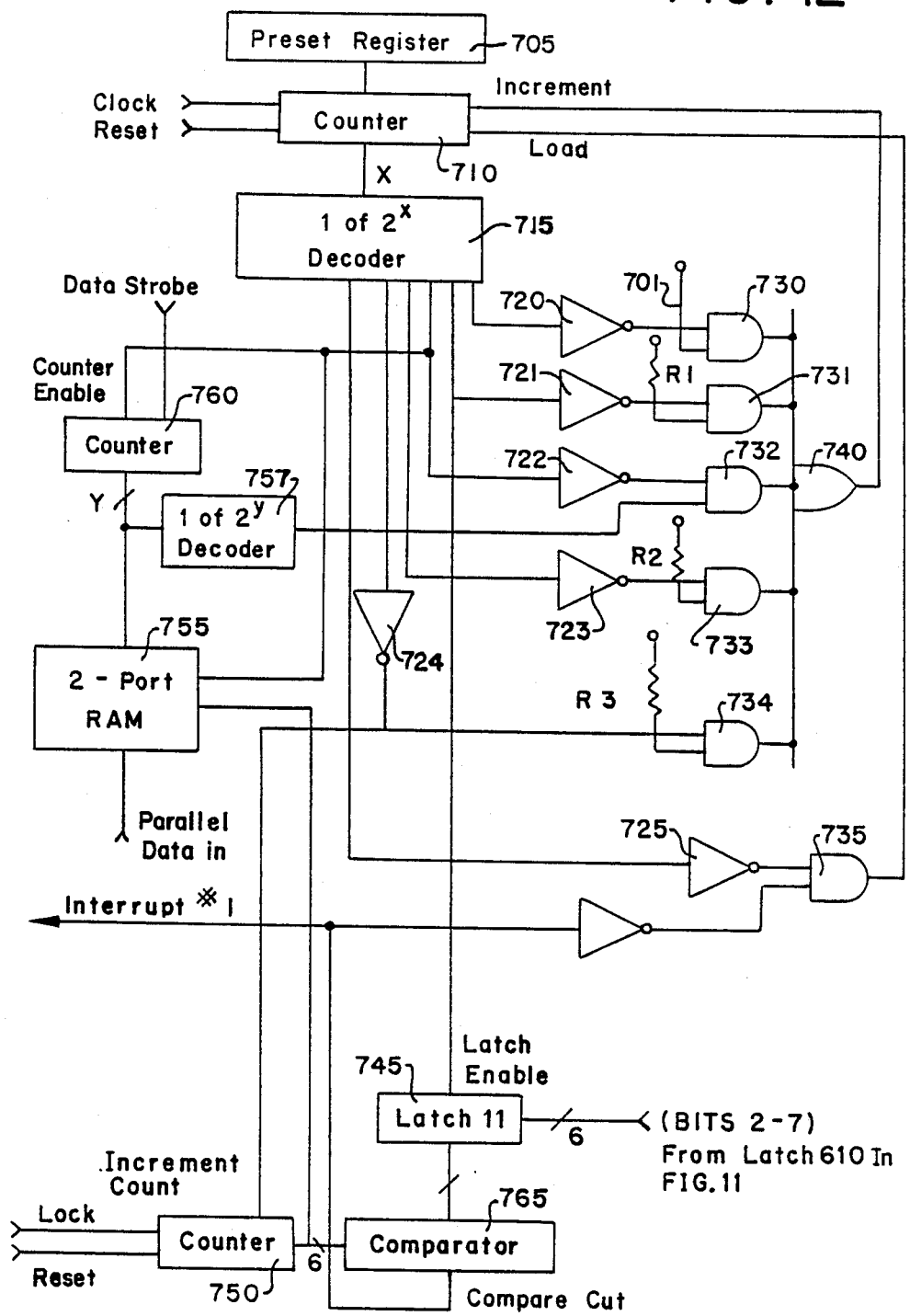
FIG. 12 depicts, in detailed schematic form, element 700 of FIG. 10 which corresponds to the setup mode.
Figure 13:
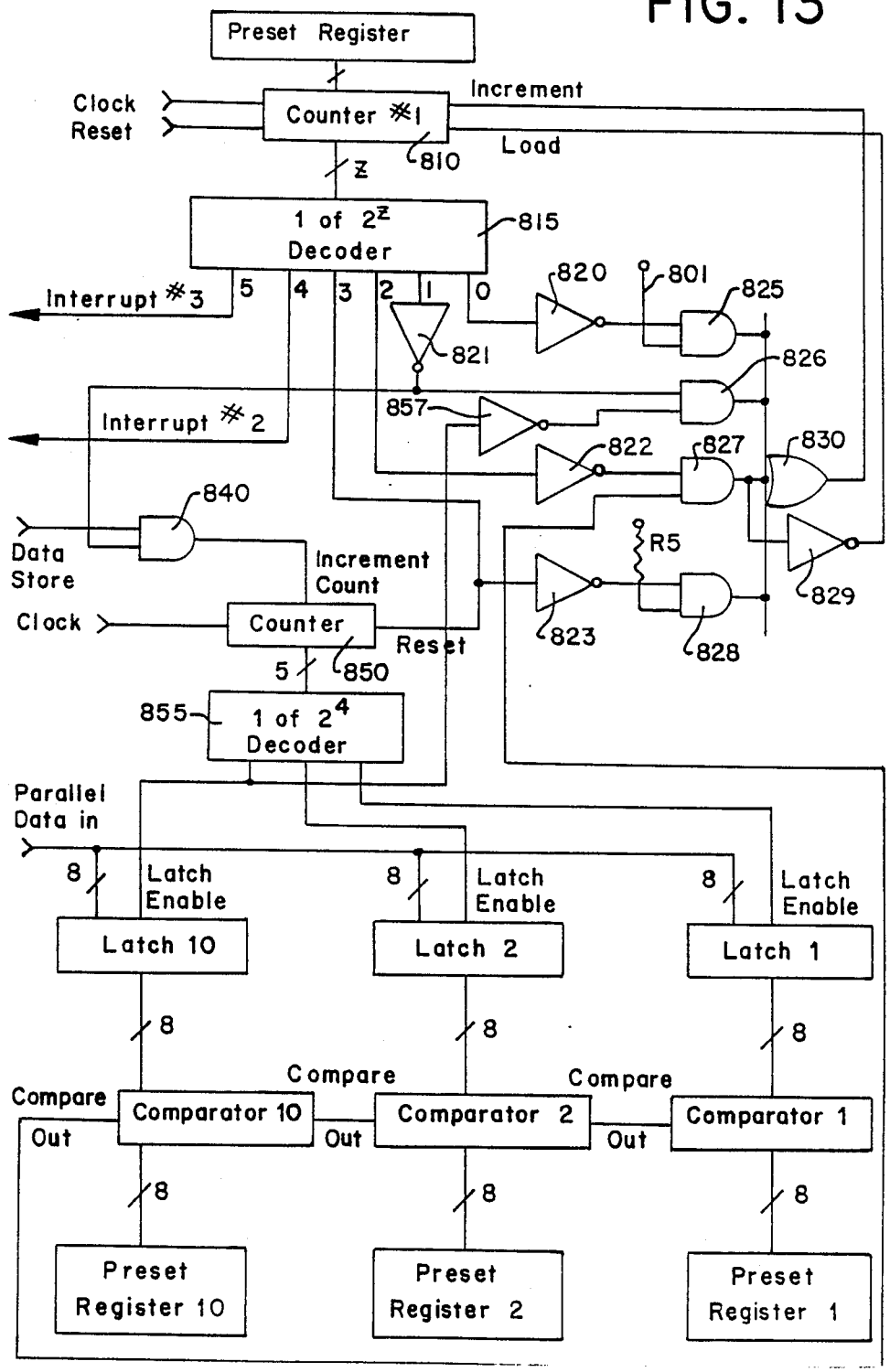
FIG. 13 depicts, in detailed schematic form, element 800 of FIG. 10 which corresponds to the data mode.

FIG. 11 depicts circuit 600 of FIG. 10 in greater detail. Latch 610 stores the first byte of the data string received and is enabled by AND gate 615. A data strobe signal which indicates whether an input byte is provided is ANDed by AND gate 615 with an enable signal which indicates whether the input byte is the first byte to provide the latch enabling signal. The two least significant bits are the mode indicator bits and are compared by three two-bit comparators 620, 625 and 630 with two reference bits in register 635 (bits 01), 640 (bits 10) and 645 (bits 11) to determine whether the setup mode, data mode, or terminate mode, respectively is required. The circuit of FIG. 12 is enabled by line 701 if the setup mode is required, while the circuit of FIG. 13 is enabled by line 801 if the data mode is required. If the terminate mode is required, interrupt number 4 is generated on line 901 to CPU 900, thus removing that particular node from the network.

FIG. 12 depicts in detail the circuit enabled when the setup mode is required. This circuit essentially stores station phone numbers in a two-port RAM 755 and signals the CPU following a setup mode request. This is accomplished by generating six sequential states. These states are represented by terminals 0–5 of 1 of $2^x$ decoder 715 and are generated by preset register 705, counter 710, decoder 715, inverters 720–725, AND gates 730–735 and OR gate 740. Sequential counter 710 is incremented by AND gates 730–735 and OR gate 740. The count signal is input to decoder 715 which outputs signals on terminals 0–5 representative of the six states necessary to store station phone numbers in RAM 755. The six states are sequenced upon the completion of the task in each state by feeding the signals back through AND gates 730–735 and OR gate 740 to increment counter 710.

The circuit functions as follows. The circuit is initially in state 0 where terminal 0 of decoder 715 is logic low while terminals 1–5 are logic high. In state 0, the circuit waits for a logic high signal on line 701, indicating that a setup mode is requested. Once line 701 receives a logic high signal, it will be ANDed with the logic low signal inverted by inverter 720, thus inputting a logic high signal into OR gate 740 which causes counter 710 to increment. The new count signal is input to decoder 715, causing a logic low on terminal 1, thus establishing state 1. In state 1, latch 745 is enabled. Latch 745 stores the six most significant bits 2–7 of the first byte of the data string which specify the quantity of telephone numbers being sent from latch 610 in FIG. 11. State 1 will also cause inverter 721 to output a logic high signal which is ANDed with a high signal on pull-up resistor R1 by AND gate 731. This high signal is then input to OR gate 740 which causes counter 710 to increment and decoder 715 to output a low signal on terminal 2, thus establishing state 2.

In state 2, addressing counter 760 and two-port RAM 755 are enabled. Addressing counter 760 then provides a count signal to two-port RAM 755 and 1 of $2^y$ decoder 757. Decoder 757 serves to provide a delay between states 2 and 3 sufficient to permit loading of a complete phone number into RAM 755. The first phone number is now stored in RAM 755 during state 2. Decoder 757 outputs a logic high signal once counter 760 has reached a predetermined count. This logic high signal is ANDed by AND gate 732 with the logic low signal of state 2 inverted by inverter 722, thus providing OR gate 740 with a logic high signal. OR gate 740 then causes counter 710 to increment and decoder 715 to output a logic low on terminal 3, establishing state 3.

In state 3, counter 760 is reset in order to enable it to store the next phone number. The logic low signal of state 3 is inverted by inverter 723 and ANDed by AND gate 733 with a logic high signal on pull-up resistor R2. AND gate 733 then outputs a logic high signal to OR gate 740. OR gate 740 then causes counter 710 to increment and decoder 715 to output a logic low on terminal 4, establishing state 4. In state 4, the counter 750 is incremented. The logic low signal of state 4 is inverted by inverter 724 and ANDed by AND gate 734 with pull-up resistor R3, providing a logic high signal to OR gate 740. OR gate 740 then outputs a logic high signal to counter 710, causing it to increment and decoder 715 to output a logic low signal on terminal 5, establishing state 5. In state 5, the output of counter 750 is compared with the value stored in latch 745 by comparator 765. If the values don't compare, i.e., the quantity of phone numbers to be stored is greater than the quantity that has been stored, a load signal is output by AND gate 735 to counter 710 causing it to load the value stored in preset register 705 and jump to state 3. If the values compare, i.e., all the phone numbers sent have been received, the output of comparator 765 will be logic high, generating an interrupt (interrupt number 1) to the CPU and disabling AND gate 735.

FIG. 13 depicts in detail the circuit enabled when the data mode is required. This circuit essentially checks the destination address in the message stream and also accomplishes its tasks in a series of six sequential states. These six states are represented on terminals 0–5 of 1 of $2^z$ decoder 815 and are generated by preset register 805, counter 810, decoder 815, inverters 820–824, AND gates 825–829 and OR gate 830. A number of inverters, AND gates and an OR gate provide the necessary time delay between states, in a manner similar to that described in conjunction with FIG. 12. Preset register 805, counter 810 and decoder 815 function similarly to present register 705, counter 710 and decoder 715 of FIG. 12.

The six sequential states are as follows. The circuit is initially in state 0 where terminal 0 of decoder 715 is logic low while terminals 1–5 are logic high. In state 0, line 801 of the circuit in FIG. 11 is examined for the data mode. If the data mode is enabled, both inputs to AND gate 825 are logic high, providing a high output which is input to OR gate 830. OR gate 830 then causes counter 810 to increment and subsequently decoder 815 to output a logic low on terminal 1, establishing state 1.

In state 1, AND gate 840 outputs a logic high to increment the counter 850 when the data strobe is also logic high. An output count signal from counter 850 is then input to 1 of $2^4$ decoder 855. The output of sequential addressing decoder 855 enables latches 1–10 in sequential order, and, like that of decoders 715 and 815, is low in the active state. Once latch 10 is enabled by decoder 855, inverter 857 outputs a logic high signal to AND gate 826, which also receives a logic high signal from the inverted logic low signal of state 1. AND gate 826 then outputs a logic high signal to OR gate 830 which increments counter 810. Counter 810 then causes decoder 815 to output a logic low on terminal 2, establishing state 2.

Comparators 1–10 compare the destination address, illustratively a ten digit telephone number, which is stored in latches 1–10 against the values stored in preset registers 1–10. If the destination address compares, i.e., the message is meant for that device, comparator 10 will output a logic high compare out signal which is input to AND gate 827 along with the logic low signal of state 2 inverted by inverter 822. AND gate 827 then outputs a logic high signal to OR gate 830, which increments counter 810. Counter 810 then causes decoder 815 to output a logic low on terminal 3, establishing state 3.

The logic low of state 3 causes counter 850 to reset and subsequently increment counter 810 via inverter 823, pull-up resistor R5, AND gate 828 and OR gate 830. Counter 810 then causes decoder 815 to output a logic low on terminal 4, establishing state 4. In state 4, an interrupt (interrupt number 2) is sent to the CPU.

If the destination address does not compare with the stored value, i.e., the message is meant for another device, the compare out signal of comparator 10 will be logic low. When this signal is inverted by inverter 824 and applied to AND gate 829 along with the signal from inverter 822, AND gate 829 will output a logic high signal during state 3 that constitutes a load signal to counter 810 causing it to load the value stored in preset register 805 and jump to state 5. In state 5 an interrupt (interrupt number 3) is sent to the CPU. At all other times the output of AND gate 829 will be low and the load terminal inactive.

Figure 14:
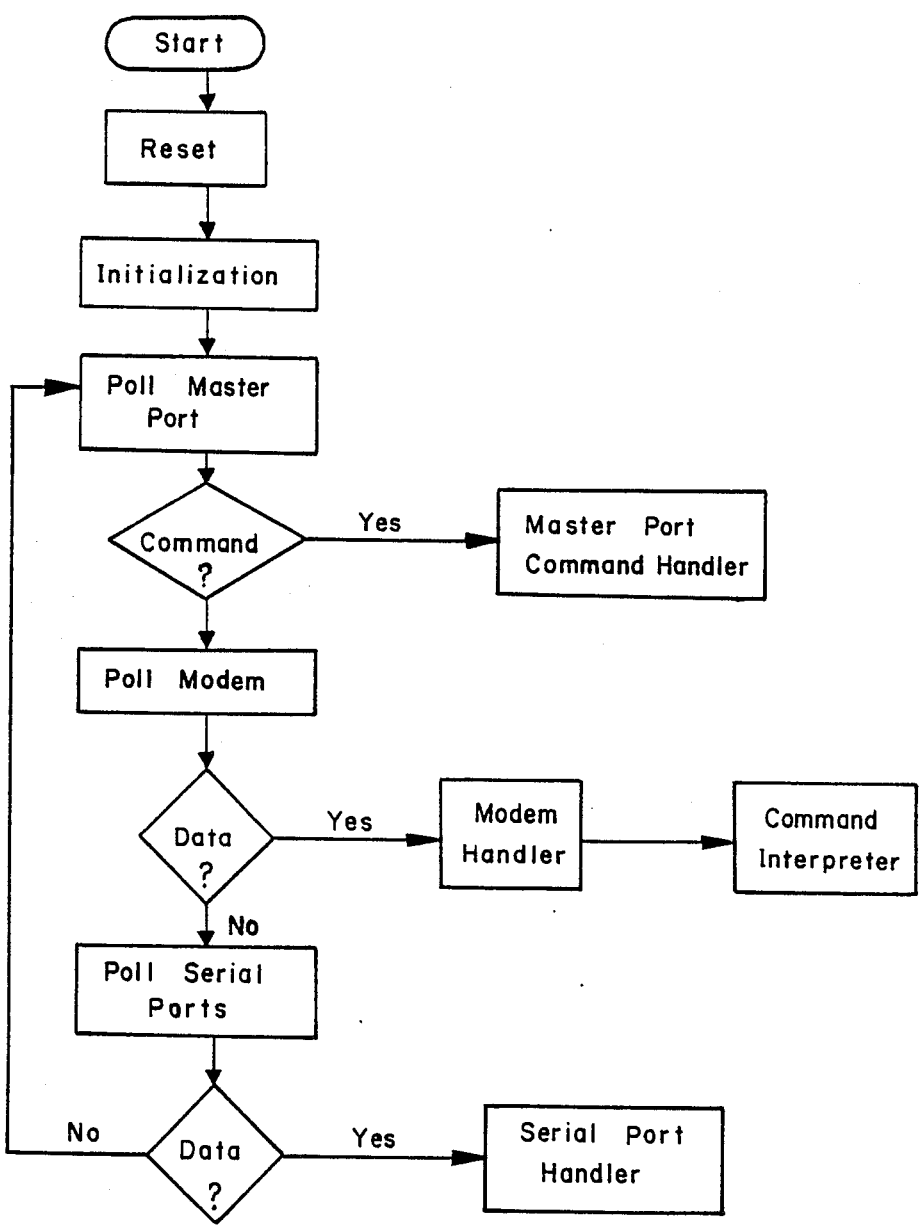
FIG. 14 is a flowchart of the operation of the system handler which performs polling functions.

Referring to FIG. 14, a flowchart is illustrated for the system handler which polls the master port, the modem port, and the serial ports. If the system handler identifies a port as in need of service, it will branch to an appropriate service routine.

More specifically, the hardware of the peripheral coprocessor is initially reset and the software initialized. The master port is then polled to determine the presence of any commands. If such commands are found on the master port, the master port command handler routine is entered. If no such commands are found on the master port, the modem device set is polled to determine the presence of any data. If such data is found on the modem device set, the modem handler routine and the command interpreter are entered into. If no such data is found on the modem device set, the serial ports are polled to determine the presence of any data. If such data is found on the serial ports, the serial port handler routine is entered. If no such data is found on the serial ports, the above polling process is performed again, starting with polling the master port to determine the presence of any commands.

Figure 15:
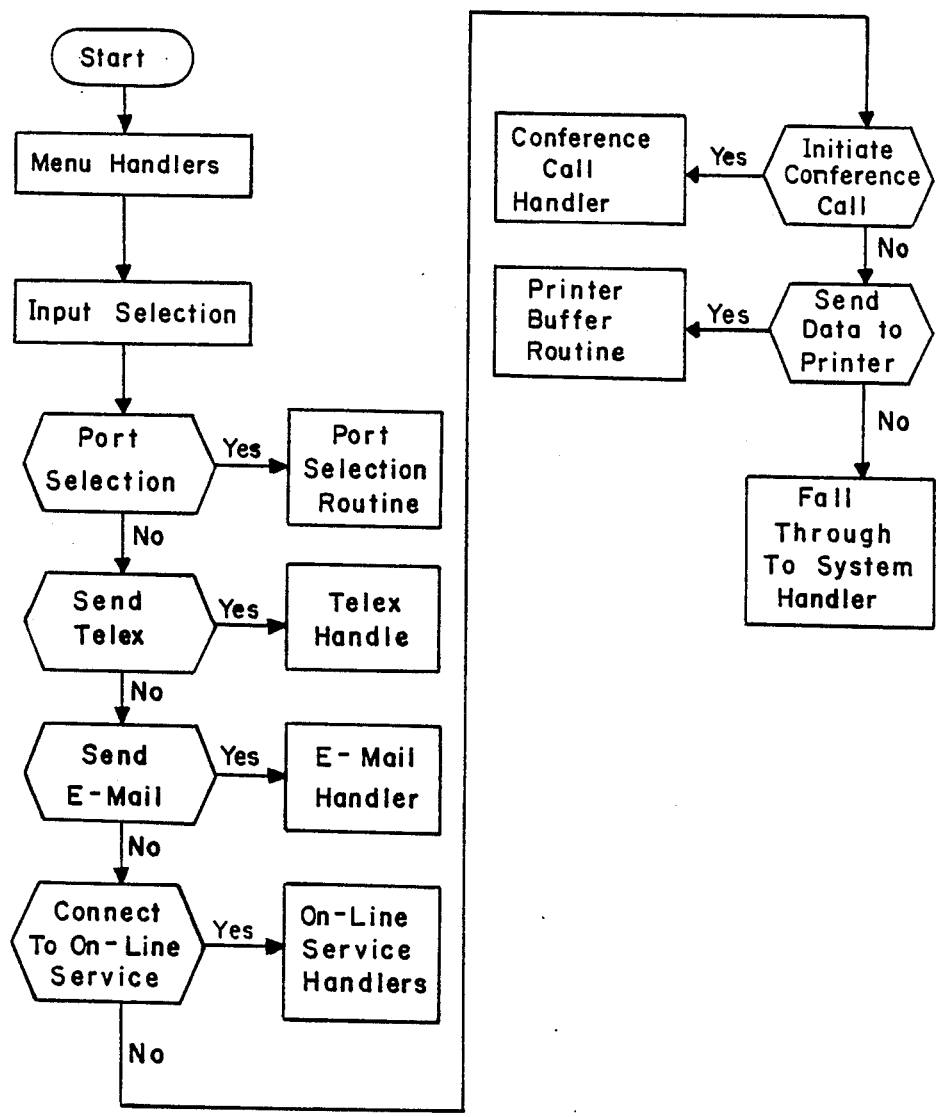
FIG. 15 is a flowchart of the operation of the master port handler.

Referring to FIG. 15, a flowchart is illustrated for the master port command handler which handles commands from devices connected to the master port. Such commands illustratively involve originating the network and the processing of messages including electronic mail, telexes and on-line database transfers. The system handler of FIG. 14 generally calls this routine upon polling the master port and finding commands thereon.

More specifically, once this routine is entered, a menu is examined and input selected to initialize communications with the particular device connected to the master port. A determination is made based on the command(s) read whether additional ports are necessary. If so, the port select routine is entered. If an additional port(s) is not required, a determination is made whether to send a telex. If a telex is required to be sent, a telex handler routine is entered. If no such telex needs to be sent, a determination is made whether to send electronic mail. If electronic mail is to be sent, an electronic mail handler routine is entered. If no such electronic mail is to be sent, a determination is made whether to connect the master port to on-line services. If such connection is required, an on-line service handler is entered. If not, a determination is made whether to initiate a conference call. If such a call is required, a conference call handler routine is entered. If no such call is required, a determination is made whether to send data to a printer, in which case a printer buffer routine is entered. If no such data needs to be sent to the printer, the master port command handler is exited and the system handler entered to again poll the master port, the modem and the serial ports.

Figure 16:
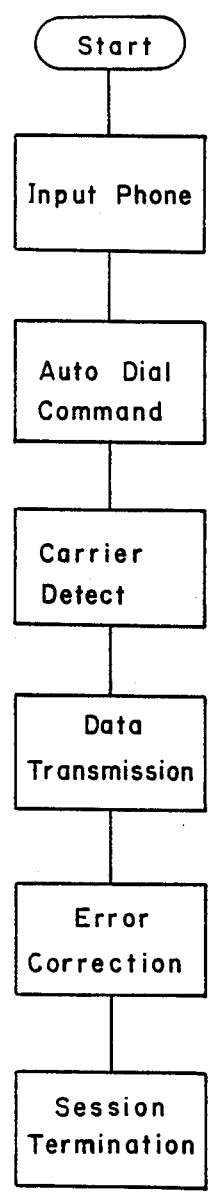
FIG. 16 is a flowchart of the operation of the modem handler.

Referring to FIG. 16, a flowchart is illustrated for the modem handler which initiates calls, checks for carrier detection and performs error corrections. The system handler of FIG. 14 generally calls this routine upon polling the modem and finding data thereon.

More specifically, once data is found by the system handler on the modem, the telephone number of the communication source is input and an auto-dial command issued to establish communication. The line is then examined to detect a carrier, and once detected, data transmission is allowed. Error correction is performed so as to remedy detected communication errors. Upon exchange of all required data, the modem handler routine is terminated.

Thus, it can be seen that there is provided a cost efficient dynamically configurable communications network not limited to a fixed configuration or by a maximum communication line length. Furthermore, as will be apparent to one skilled in the art, the present invention may be used as a buffer wherein a computer is enabled to send data at a high speed to a slower device, freeing the computer to do more productive work, as an electronic mail system wherein a user sends and receives messages as well as distributes messages selectively via his local unit either inter-actively or via store and forward techniques, as an automatic accessing device to automatically access and download from on-line database services, as a remote access wherein a remote user accesses other system resources or transmits data to be stored or buffered and printed, and as a telex-type device wherein telexes are sent and received.

In addition, the present invention can implement conference calling, in which user A calls user B, user B calls user C through a modem connected to his peripheral processor, linking all three users simultaneously.

It is therefore to be understood that the invention can be carried out by specifically different equipment and devices and that various modifications, both as to equipment details and operating procedures can be effected without departing from the spirit and scope of the claimed invention.

What is claimed is:

1. A dynamically configurable communications network comprising:
   (a) a plurality of nodes;
   (b) a peripheral coprocessor means at each of said nodes, said peripheral coprocessor means including:
      (i) central processing means;
      (ii) input/output controlling means for controlling input and output of data, setting up a subnetwork of at least three nodes connected in a serial fashion and enabling communication among nodes of said subnetwork;

(iii) memory means for control and storage of data; and (iv) port circuitry coupled to said input/output controlling means for connecting said peripheral coprocessor to a data processing device;

(c) means for interconnecting said nodes via a switched network; and (d) data mode means for enabling data transmission among the nodes of said subnetwork, said data transmission occurring in a serial fashion from one node to another, wherein communication among nodes of said subnetwork of nodes takes place by a first node of said subnetwork establishing a data path via existing communication lines of the switched network between said first node and a second node of said subnetwork, and said second node establishing a data path via existing communication lines of the switched network between said second node and a third node of said subnetwork and wherein data is selectively provided to said nodes according to destination information contained within a header portion of a data string.

2. The communications network of claim 1 where said peripheral coprocessor further comprises telephone interface circuitry for connecting said peripheral coprocessor to a telephone line.

3. The communications network of claim 1 wherein said setup mode means is capable of setting up said subnetwork a plurality of ways.

4. The communications network of claim 1 wherein said data mode means causes a data string to be transmitted from a first node to a second node.

5. The communications network of claim 4 wherein said data string comprises information indicating of a mode of operation.

6. The communications network of claim 5 wherein said mode of operation is one of a group of setup mode, data mode and terminate mode.

7. The communications network of claim 4 wherein said data comprises node identification information.

8. A peripheral coprocessor means for use in a configurable communication network and capable of wide area networking utilizing existing communication lines comprising:

a central processing means;

an input/output controlling means for controlling input and output of data, setting up a subnetwork of at least three nodes and enabling communication among nodes of said subnetwork;

a memory means for control and storage of data; and port circuitry coupled to said input/output controlling means for connecting said peripheral coprocessor to a data processing device, wherein communication among said subnetwork nodes takes place by a first node of said subnetwork establishing a data path via the existing communication lines between said first node and a second node of said subnetwork, and said second node establishing a data path via the existing communication lines between said second node and a third node of said subnetwork and wherein data is selectively provided to said nodes according to destination information contained within a header portion of a data string.

9. The peripheral coprocessor of claim 8 further comprising telephone interface circuitry for connecting said peripheral coprocessor to a telephone line.

10. The peripheral coprocessor of claim 9 wherein said telephone interface circuitry comprises:

a serial adapter coupled to said input/output controlling means for serial-parallel data conversion;

a modem device set coupled to said serial adapter for modulation and demodulation of data; and a line interface coupled to said modem device set for connection to said telephone line.

11. The peripheral coprocessor of claim 8 wherein said port circuitry comprises port select logic coupled to said input/output controlling means for selecting a port and a port driver for driving said port.

12. The peripheral coprocessor of claim 8 wherein said port circuitry comprises a master port controller for controlling a master port and a master port driver for driving said master port.

13. A method for dynamically configuring a communications network using switched communications lines comprising the steps of:

setting up a subnetwork of at least three nodes within an array of nodes in a specific order to establish a desired configuration, said subnetwork of nodes being connected together by at least one data path formed from said communications lines, said step of setting up including the step of passing a list from a first node to a second node, said list identifying nodes to comprise said configuration;

accessing a first node of said subnetwork by transmission of a data string from a second node to said first node over said data path;

selectively processing said data string at said first node according to a destination address of said data string to determine if said data string has reached the node specified by said destination address; and passing said data string to the next node of said subnetwork if said data string has not yet reached the node specified by said destination address.

14. The method of claim 13 wherein said step of setting up further comprises appending to said list at said second node information identifying additional nodes to comprise said configuration.

15. The method of claim 13 wherein said step of passing comprises the step of communicating said list from said first node to said second node by telephony.

16. The method of claim 13 wherein said step of processing comprises the step of stripping a leading and a trailing header from said data string and storing a message in memory.

17. The method of claim 13 wherein said step of processing comprises the step of communicating said data string to another node.

18. A dynamically configurable communications network comprising:

a plurality of nodes;

a peripheral coprocessor at each of said nodes;

input/output means at each node for connecting said coprocessor and a data processing device associated with said node;

means for interconnecting said nodes via a switched network;

setup mode means for automatically establishing a subnetwork of at least three of said nodes using said interconnecting means, said subnetwork being set up so that the nodes are connected in a serial fashion; and data mode means for enabling data transmission among the nodes of said network, said data transmission occurring in a serial fashion from one node to another, said data mode means causing a data string having information indicative of a mode of operation to be transmitted from a first node to a second node;

wherein said mode of operation is one of a group of at least three modes comprising a setup mode, a data mode and a terminate mode.

19. The communications network of claim 18 wherein said setup mode means comprises:

means for receiving a list having a plurality of identification numbers of stations remaining to be added to said network, said list also having information identifying the operating mode and the quantity of said plurality of identification numbers;

memory means for storing said plurality of identification numbers one at a time; and comparator means for comparing the quantity of identification numbers that have been stored to said quantity of said plurality of identification numbers;

wherein said comparator means outputs an interrupt signal to a central processing unit if said quantity of identification numbers that have been stored equals said quantity of said plurality of identification numbers.

20. The communications network of claim 18 further comprising a terminate mode means comprising:

means for receiving a list having a plurality of identification numbers of stations remaining to be added to said network, said list also having information identifying the operating mode and the quantity of said plurality of identification numbers; and means for generating an interrupt signal to a central processing unit if the information identifying the operating mode identifies a terminate mode.

* * * * *